United States Patent Office 2,781,235
Patented Feb. 12, 1957

2,781,235

SELF-LAPPING RELAY FOR USE IN COMBINED PRESSURE AND VACUUM BRAKE SYSTEMS

Lewis A. Safford, Watertown, N. Y., assignor to The New York Air Brake Company, a corporation of New Jersey Application April 22, 1953, Serial No. 350,353

5 Claims. (Cl. 303—4)

This invention relates to dual fluid pressure brake systems, and provides a locomotive brake equipment in which an engineer's brake valve of a type standard on American railways may control locomotive and train brakes connected with a conventional brake pipe or connected with a vacuum train line, either or both. Where some of the cars in a train are equipped with automatic air brakes and others with vacuum brakes, it is necesasry that the cars be equipped both with a brake pipe and a vacuum line and when this is the case, cars equipped with different brakes of the two types may be mixed in one train.

The invention offers a very simple structure using adaptations of mechanisms proved in the automatic air brake art, and affords many of the advantages offered by the somewhat more expensive structure disclosed in the patent to Sudduth 2,363,624, November 28, 1944.

A locomotive equipped according to the invention has a brake pipe for automatic air brakes, a vacuum train pipe for vacuum brakes, a main reservoir with compressor and the usual compressor controls, and a vacuum reservoir with exhauster and appropriate controls therefor.

The invention provides a vacuum brake valve, which basically is a self-lapping relay of a type known in the air brake art, but so contrived as to respond to changes of brake pipe pressure and produce harmonious changes of pressure in the vacuum train pipe, which changes effectuate the self-lapping function. In this way a very simple and practical dual control mechanism is provided.

An embodiment of the invention which has been built and successfully tested is illustrated in the accompanying drawings to which reference will now be made.

Figure 1:
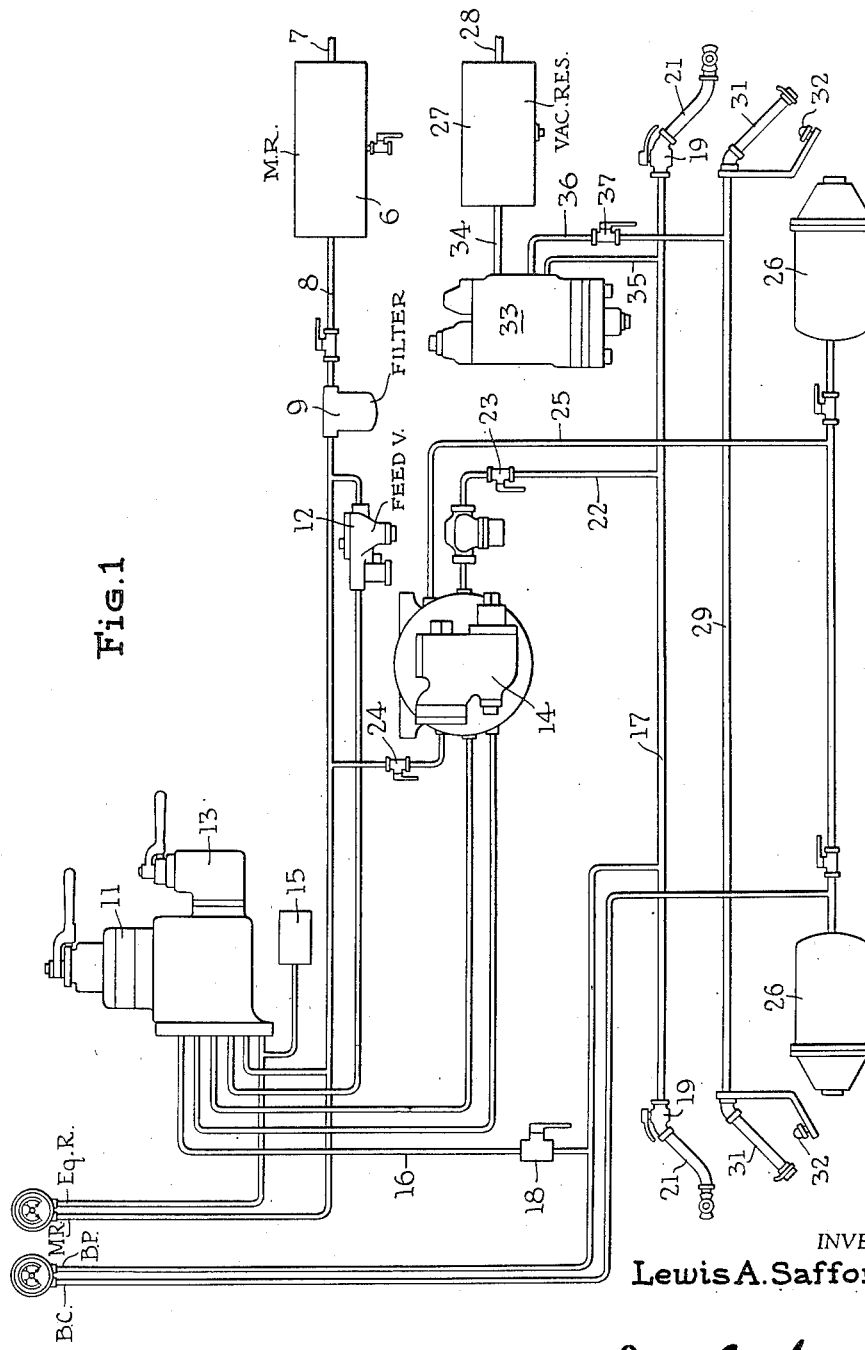
Figure 1 is an elevation, somewhat diagrammatic in character showing the basic components for a locomotive with the important pipe connections.

Reference should first be made to Figure 1 which shows a conventional locomotive equipment conforming generally to standard American practice. It will therefore be necessary merely to identify the basic components which are too familiar to required detailed description.

The main reservoir 6 is supplied with compressed air through the pipe 7 by compressor, which is not shown. This compressor is controlled in any usual manner. The main air line 8 leads from the main reservoir through a filter 9 to the engineer's brake valve indicated generally by the numeral 11. This desirably is of the equalizing discharge type and has connected thereto an equalizing reservoir 15. There is the usual connection from the pipe 8 to the engineer's brake valve 11 through the feed valve 12. The pipe 8 also supplies air to the independent brake valve indicated generally by the numeral 13, the connection being through the mount which supports the engineer's brake valve 11. There is also a connection to the distributing valve 14.

The engineer's brake valve 11 is connected by a branch pipe 16 with the brake pipe 17 which extends from end to end of the locomotive and has at each end an angle cock 19 and coupling hose 21. The double-heading cock 18 is interposed in the branch pipe 16 as usual. The pipe 22 with cut-out cock 23 connects the brake pipe 17 with the distributing valve 14. A cut-out cock 24 is interposed in the connection between the main reservoir pipe 8 and the distributing valve 14. The distributing valve is connected by the pipe 25 with locomotive brake cylinders 26.

Other familiar automatic air brake connections are shown on the drawing but are common in the art and require no detailed description. Some of them, notably the gage connections are identified by legends.

So far the description has dealt with the automatic air brake part of the system. In addition to this there is certain vacuum brake equipment now to be described.

There is a vacuum reservoir 27 which is evacuated by the usual exhauster connected at 28 and controlled in any ordinary way. The vacuum train line 29 extends the length of the locomotive and has at each end a coupling hose 31 for connection to the vacuum train line of an adjacent car. Each hose terminates in a conventional vacuum coupling which, when not in use, is sealed by plug 32 conventionally mounted on a bracket, as shown.

The vacuum controlling valve, which is the essence of the present invention is generally indicated in Figure 1 by the numeral 33. This valve is illustrated in detail in Figure 2, but first, certain essential connections to it will be identified on Figure 1.

The main vacuum connection 34 leads to the vacuum reservoir 27. A connection 35 leads from the brake pipe 17. A connection 36 leads from the vacuum train line 29, and may be closed by a stop-cock 37. The cylinders 26 are the only brake cylinders on the locomotive and are controlled through the distributing valve 14.

The vacuum train pipe 29 is used to control vacuum brakes on connected cars just as the automatic brake pipe 17 is used to control automatic brakes on connected cars. Obviously a locomotive equipped as above set forth is intended to be used to control cars equipped with either system. If a brake pipe and a train pipe extend through a train and are connected respectively to corresponding brake mechanisms on different cars, a locomotive equipped as above described can control both types of brakes at the same time. A characteristic of the valve 33 is its ability to correlate these two controls so that violent slack action will not occur.

Figure 2:
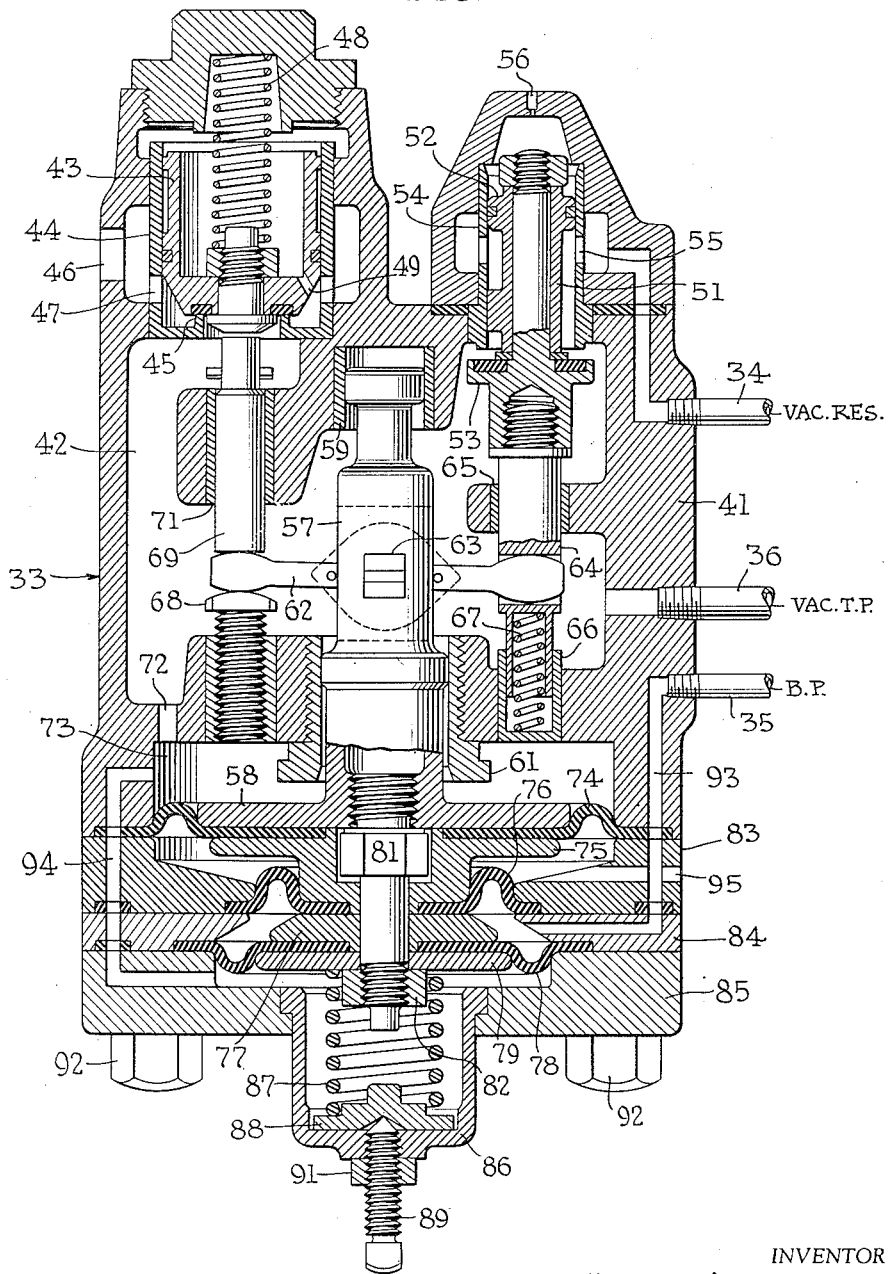
Figure 2 is an axial section of the self-lapping relay which is the crux of the invention.

In the following description statements of direction will be made with reference to Figure 2 as a matter of convenience, and without implying that the valve need be positioned as there shown.

The housing 41 encloses a chamber 42, and in the housing is enclosed an admission and exhaust valve mechanism similar to but not identical with the self-lapping relay valve mechanism used in air brakes.

A cup shaped atmospheric valve 43 is reciprocable in bushing 44 and coacts with seat-flange 45 formed on the bushing to control the admission of atmospheric air to chamber 42. This air enters at 46, and flows through ports 47 in the bushing. The valve is biased closed by coil compression spring 48 and pressures on it are partially equalized by port 49. The mechanical details are clearly shown in the drawing and since they are not to be claimed require no detailed description.

The vacuum valve 51 is a substantially balanced valve, having a piston portion 52 and a poppet head 53 which seats on the end of bushing 54 in reverse relation to the seating of valve 43. The vacuum reservoir connection 34 communicates through ports 55 with the interior of bushing 54 and thence past head 53 (when the latter is unseated) with chamber 42. The space above piston head 52 is vented to atmosphere at 56.

A stem 57 carries at its lower end a diaphragm thrust plate 58, and is guided in its up and down motions by guide-bushings 59 (which receives the upper end of the stem) and 61 which guides the stem a short distance above plate 58, the bushings being fixed in housing 41.

A two armed lever 62 is fulcrumed at its middle at 63 on stem 57. At its right end it engages a slot in stem 64 which is attached to vacuum valve 51, the stem being guided in bushings 65, 66, supported by housing 41. The stem is biased upward by a rather weak coil compression spring 67 arranged as clearly shown in the drawing.

At its left end the lever 62 extends between an adjustable stop 68 (supported by housing 41) and the lower end of a freely shiftable push rod 69 which is guided in bushing 71 also sustained by housing 41. The upper end of push rod 69 is positioned to engage valve 43 and thrust and unseat the valve. The spring 67 and stop 68 make it possible to define a point of impositive arrest in which valve 43 is closed and valve 51 is open only enough to neutralize leakage to the vacuum train pipe.

The parts are so arranged that downward motion of stem 57 allows valve 43 to close and then opens valve 51. Upward motion of the stem closes valve 51 and then unseats valve 43.

The vacuum train pipe 36 is in constant free communication with chamber 42 and also, via port 72 with the space 73 below the partition in which bushing 61 is mounted.

Below the chamber 73 is a diaphragm pile made up of three flexible diaphragms connected at their centers to each other and to stem 57.

The largest diaphragm 74 is clamped at its center against plate 58 by hub 75. The next lower and smallest of the three diaphragms 76 is clamped at its center between hub 75 and disc 77 and the lower-most and intermediate sized diaphragm 78 is clamped between discs 77 and 79. A stud 81 screwed into the lower end of stem 57 and a nut 82 develop the necessary clamping force.

The peripheries of the three diaphragms 74, 76 and 78 are clamped in successive seats between the housing 41, two spacing rings 83 and 84 and the cap 85 whose form is adequately disclosed in the drawing.

A cup 86 is pressed into a central aperture in cap 85 and houses a loading spring 87 and an adjustable seat 88 for its lower end. This seat is adjustable by turning screw 89. The screw is sealed and locked by nut 91. Bolts 92 hold the parts 41, 83, 84, and 85 in assembled relation and develop the necessary clamping force.

The brake pipe branch 35 communicates by passage 93 with the space between diaphragms 76 and 78. The space 73 which is in free communication with the vacuum train pipe is also in free communication via passage 94 with the space beneath diaphragm 78. The space between diaphragms 74 and 76 is in free communication with the atmosphere via passage 95.

The effect of the three pressures which react on the diaphragm stack, namely vacuum train pipe pressure, brake pipe pressure and atmospheric pressure can be easily analyzed.

Vacuum train pipe pressure is sub-atmospheric but under release conditions, amounts to about 5 p. s. i. absolute and acts upward on the entire area of diaphragm 78 and downward on the entire area of the largest diaphragm 74 so that the effective force is downward and equal to the absolute pressure effective in the vacuum train pipe multiplied by the difference of the areas of said diaphragms.

Brake pipe pressure acts downward on diaphragm 78 and upward on diaphragm 76 which is smaller. Hence the force developed is downward and equal to the absolute brake pipe pressure multiplied by the difference between the areas of diaphragms 76 and 78.

Atmospheric pressure variations are not significant and can be assumed to be constant at 14.7 p. s. i. absolute. Hence since diaphragm 74 is larger than 76, the reaction is upward, 14.7 pounds absolute multiplied by the difference between diaphragm areas. This affords a constant loading assisting spring 87.

Assume the feed valve is set for 70 p. s. i. gage. With brake pipe at 70 pounds gage all brakes should release, so that the valve 43 should be closed and valve 51 wide open. This is one limiting condition.

The other limiting condition is a full service automatic application which occurs when brake pipe pressure is reduced to about 45 p. s. i. gage. Under this condition valve 51 should be closed and valve 43 wide open so that the vacuum train pipe is at atmospheric pressure.

These two limits and the frictional resistance offered by the mechanism make it a relatively simple matter to select diaphragm areas and the characteristics of spring 87. If the mechanism functions to meet the two limiting conditions the brake action will be reasonably well graduated at intermediate values.

Briefly stated, in running condition of the system, the automatic brake pipe is fully charged and the vacuum train pipe is evacuated. A definite reduction of brake pipe pressure, which as is well understood causes a definite application of the automatic air brakes, also (through the action of the relay) causes a definite rise in vacuum train pipe pressure and consequently a definite application of the vacuum brakes. There is the usual range of service applications for each system. Complete venting of the automatic brake pipe causes an emergency application of the air brakes and also connects the vacuum train pipe with atmosphere so that the vacuum brakes apply on the emergency basis.

What is claimed is:

1. A self-lapping relay for controlling sub-atmospheric pressures in a vacuum train pipe in response to variations of super-atmospheric pressure in the brake pipe of an automatic air brake system comprising in combination a first valve controlling flow from the atmosphere to the vacuum train pipe; a second valve controlling flow from the vacuum train pipe to an evacuating means; an actuating mechanism for said valves shiftable from a neutral position, in which both valves are closed, in reverse directions to open said valves selectively; a differential displacement multiple abutment pressure motor in which the absolute pressures in the brake pipe and train pipe act concurrently on different effective abutment areas in a direction to cause opening of the second valve, the train pipe pressure acting on the larger of said areas; and loading means biasing said actuator in opposition to said pressures.

2. A self-lapping relay for controlling sub-atmospheric pressures in a vacuum train pipe in response to variations of super-atmospheric pressure in the brake pipe of an automatic air brake system comprising in combination a first valve controlling flow from the atmosphere to the vacuum train pipe; a second valve controlling flow from the vacuum train pipe to an evacuating means; an actuating mechanism for said valves shiftable from a neutral position, in which both valves are closed, in reverse directions to open said valves selectively; impositive stop means for arresting said actuating mechanism in a position in which the first valve is closed and the second is open only enough to neutralize in-leakage to the vacuum train pipe; a differential displacement multiple abutment pressure motor in which the absolute pressures in the brake pipe and train pipe act concurrently on different effective abutment areas in a direction to cause opening of the second valve, the train pipe pressure acting on the larger of said areas; and loading means biasing said actuator in opposition to said pressures.

3. A self-lapping relay for controlling sub-atmospheric pressures in a vacuum train pipe in response to variations of super-atmospheric pressure in the brake pipe of an automatic air brake system comprising valve means shiftable toward opposite limits to connect the vacuum train pipe selectively with atmosphere and with evacuating means and having intermediate positions in one of which both said connections are closed and in the other of which the atmospheric connection is closed and the evacuating connection is open sufficiently to neutralize in-leakage to the train pipe; impositive means for arresting the valve means in the last named position; a differential displacement multiple abutment pressure motor in which the absolute pressures in the brake pipe and train pipe act concurrently on different effective abutment areas to shift said valve means in the direction to connect the evacuating means, the train pipe pressure acting on the larger of said areas; and loading means biasing said motor in the opposite direction.

4. A self-lapping relay for controlling sub-atmospheric pressures in a vacuum train pipe in response to variations of super-atmospheric pressure in the brake pipe of an automatic air brake system comprising in combination a first valve controlling flow from the atmosphere to the vacuum train pipe; a second valve controlling flow from the vacuum train pipe to an evacuating means; an actuating mechanism for said valves shiftable from a neutral position, in which both valves are closed, in reverse directions to open said valves selectively; a differential displacement multiple abutment motor operatively connected with the actuating mechanism and comprising a diaphragm pile made up of enclosing means and three flexible diaphragms of three different areas, with their centers mechanically connected, train pipe pressure reacting differentially on the largest and intermediate size diaphragms in a direction to open the second valve, brake pipe pressure reacting differentially on the intermediate and smallest diaphragms also in the direction to open the second valve and atmospheric pressure reacting differentially on the smallest and largest diaphragms in the direction to close the second valve; and spring means serving to assist said reaction of atmospheric pressure.

5. A self-lapping relay for controlling sub-atmospheric pressures in a vacuum train pipe in response to variations of super-atmospheric pressure in the brake pipe of an automatic air brake system comprising in combination a first valve controlling flow from the atmosphere to the vacuum train pipe; a second valve controlling flow from the vacuum train pipe to an evacuating means; an actuating mechanism for said valves shiftable from a neutral position, in which both valves are closed, in reverse directions to open said valves selectively; impositive stop means for arresting said actuating mechanism in a position in which the first valve is closed and the second is open only enough to neutralize in-leakage to the vacuum train pipe; a differential displacement multiple abutment motor operatively connected with the actuating mechanism and comprising a diaphragm pile made up of enclosing means and three flexible diaphragms of three different areas, with their centers mechanically connected, train pipe pressure reacting differentially on the largest and intermediate size diaphragms in a direction to open the second valve, brake pipe pressure reacting differentially on the intermediate and smallest diaphragms also in the direction to open the second valve and atmospheric pressure reacting differentially on the smallest and largest diaphragms in the direction to colse the second valve; and spring means serving to assist said reaction of atmospheric pressure.

References Cited in the file of this patent

UNITED STATES PATENTS

| | | |
|---|---|---|
| 1,943,574 | Winter | Jan. 16, 1934 |
| 2,184,549 | Farmer | Dec. 26, 1939 |
| 2,363,624 | Sudduth | Nov. 28, 1944 |